US010919397B2

(12) United States Patent
Kojima

(10) Patent No.: US 10,919,397 B2
(45) Date of Patent: Feb. 16, 2021

(54) VEHICLE, METHOD OF CONTROLLING VEHICLE, AND CHARGING SYSTEM

(71) Applicant: Toyota Jidosha Kabushiki Kaisha, Toyota (JP)

(72) Inventor: Koichi Kojima, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 381 days.

(21) Appl. No.: 15/923,315

(22) Filed: Mar. 16, 2018

(65) Prior Publication Data

US 2018/0272884 A1 Sep. 27, 2018

(30) Foreign Application Priority Data

Mar. 21, 2017 (JP) ................. 2017-054359

(51) Int. Cl.
*B60L 53/10* (2019.01)
*B60L 53/14* (2019.01)
(Continued)

(52) U.S. Cl.
CPC ........... *B60L 11/1846* (2013.01); *B60L 53/11* (2019.02); *B60L 53/14* (2019.02); *B60L 53/665* (2019.02); *B60L 58/27* (2019.02); *B60L 53/65* (2019.02); *B60L 2240/70* (2013.01); *B60L 2240/80* (2013.01); *B60L 2250/14* (2013.01); *H02J 7/02* (2013.01); *H04L 67/12* (2013.01);
(Continued)

(58) Field of Classification Search
CPC ...... B60L 11/1846; B60L 58/27; B60L 53/11; B60L 53/14; B60L 53/665; B60L 53/65; B60L 2240/70; B60L 2240/80; B60L 2250/14; H02J 7/02; H04L 67/12; Y02T 10/7005; Y02T 90/16; Y02T 90/168; Y02T 10/70; Y02T 90/167; Y04S 30/12
USPC ............................................................ 701/22
See application file for complete search history.

(56) References Cited

U.S. PATENT DOCUMENTS 8,581,545 B2 11/2013 Obayashi et al.
2011/0273139 A1* 11/2011 Hofheinz ................ B60L 8/006
320/109
(Continued)

FOREIGN PATENT DOCUMENTS

CN 104037834 A 9/2014
EP 2774801 A2 9/2014
(Continued)

*Primary Examiner* — Paula L Schneider
(74) *Attorney, Agent, or Firm* — Cesare Sclafani

(57) ABSTRACT

A vehicle that enables external charging which is charging of a vehicle-mounted electric power storage device using electric power supplied from an electric power supply outside the vehicle includes a communication device configured to communicate with a server outside the vehicle, and an electronic control unit. The ECU is configured to execute a process for timer charging that is the external charging executed in accordance with a set time schedule. When the timer charging based on alternating current charging is performed, the ECU is configured to set the time schedule in the vehicle without using the server. When the timer charging based on direct current charging is performed, the ECU is configured to control the communication device to transmit data needed for setting the time schedule in a direct current electric power supply facility to the server.

10 Claims, 11 Drawing Sheets

(51) Int. Cl.
  *B60L 58/27*  (2019.01)
  *B60L 53/68*  (2019.01)
  *B60L 11/18*  (2006.01)
  *B60L 53/66*  (2019.01)
  *H04L 29/08*  (2006.01)
  *H02J 7/02*   (2016.01)
  *B60L 53/65*  (2019.01)

(52) U.S. Cl.
  CPC ................ *Y02T 10/70* (2013.01); *Y02T 90/16* (2013.01); *Y02T 90/167* (2013.01); *Y04S 30/12* (2013.01)

(56) References Cited

U.S. PATENT DOCUMENTS

| | | | |
|---|---|---|---|
| 2013/0049677 A1 | 2/2013 | Bouman | |
| 2014/0247019 A1 | 9/2014 | Park | |
| 2015/0326012 A1* | 11/2015 | Tsuchiya | H02J 3/383 307/20 |
| 2018/0050604 A1* | 2/2018 | Hare | B60L 58/25 |
| 2018/0072171 A1* | 3/2018 | Han | B60L 53/64 |
| 2018/0272881 A1* | 9/2018 | Kojima | B60L 53/68 |
| 2018/0304761 A1* | 10/2018 | Chase | G05D 1/0291 |
| 2019/0389315 A1* | 12/2019 | Zhu | H02J 7/0071 |
| 2020/0055420 A1* | 2/2020 | Peer | B60L 53/62 |

FOREIGN PATENT DOCUMENTS

| | | |
|---|---|---|
| JP | 2011-083165 A | 4/2011 |
| JP | 2012110122 A | 6/2012 |
| JP | 2014-017891 A | 1/2014 |
| KR | 10-2014-0058864 A | 5/2014 |
| KR | 10-2014-0108987 A | 9/2014 |

\* cited by examiner

VEHICLE, METHOD OF CONTROLLING VEHICLE, AND CHARGING SYSTEM

CROSS-REFERENCE TO RELATED APPLICATIONS

This application claims priority to Japanese Patent Application No. 2017-054359, which is incorporated herein by reference in its entirety filed on Mar. 21, 2017 including the specification, drawings and abstract.

BACKGROUND

1. Technical Field

The present disclosure relates to a vehicle, a method of controlling the vehicle, and a charging system including the vehicle and particularly, relates to a vehicle that enables a vehicle-mounted electric power storage device to be charged using electric power supplied from an electric power supply outside the vehicle (hereinafter, referred to as "external charging"), a method of controlling the vehicle, and a charging system including the vehicle.

2. Description of Related Art

A vehicle that enables external charging is disclosed in Japanese Unexamined Patent Application Publication No. 2012-110122 (JP 2012-110122 A). The vehicle enables external charging that is executed in accordance with a set time schedule (hereinafter, referred to as "timer charging"). External charging is started when a charging start time indicated in the time schedule is reached. A user can set the time schedule in timer charging by operating an operational input device such as a meter or a display in the vehicle or by operating a communication terminal such as a mobile phone or a smartphone.

SUMMARY

Types of external charging include alternating current (AC) charging and direct current (DC) charging. AC charging is external charging that uses alternating current electric power supplied from an electric power supply facility (electric power supply) outside a vehicle. For example, in AC charging, the alternating current electric power supplied from the electric power supply facility is converted into direct current electric power by a charger in the vehicle. DC charging is external charging that uses direct current electric power supplied from an electric power supply facility outside the vehicle. For example, in DC charging, alternating current electric power that is supplied from an electric power supply outside the electric power supply facility is converted into direct current electric power by a charger in the electric power supply facility.

AC charging can be started by a control device (an electronic control unit, for example) that controls the charger in the vehicle on the vehicle side. DC charging can be started by a control device (an electronic control unit, for example) that controls the charger in the electric power supply facility on the electric power supply facility side. That is, when timer charging is performed, the location (in the vehicle or in the electric power supply facility) of the control device that should be started in accordance with a time schedule is different between AC charging and DC charging. Thus, a method of realizing timer charging is different between AC charging and DC charging. However, such a point is not disclosed in JP 2012-110122 A.

The present disclosure provides a vehicle that can realize timer charging based on AC charging and timer charging based on DC charging, a method of controlling the vehicle, and a charging system including the vehicle.

A first aspect of the present disclosure relates to a vehicle that enables external charging which is charging of a vehicle-mounted electric power storage device using electric power supplied from an electric power supply outside the vehicle. The vehicle includes a communication device and an electronic control unit. The communication device is configured to communicate with a server outside the vehicle. The electronic control unit is configured to execute both of a process for alternating current (AC) charging that is the external charging using alternating current electric power supplied from an AC electric power supply facility as the electric power supply, and a process for direct current (DC) charging that is the external charging using direct current electric power supplied from a DC electric power supply facility as the electric power supply. The DC electric power supply facility is configured to communicate with the server. The electronic control unit is configured to execute a process for timer charging that is the external charging executed in accordance with a set time schedule. When the timer charging based on the AC charging is performed, the electronic control unit is configured to set the time schedule in the vehicle without using the server. When the timer charging based on the DC charging is performed, the electronic control unit is configured to control the communication device to transmit data needed for setting the time schedule in the DC electric power supply facility to the server.

In the vehicle according to the first aspect of the present disclosure, when electric power information indicating an amount of electric power suppliable by the DC electric power supply facility in the DC charging is received from the DC electric power supply facility after the data is transmitted to the server, the electronic control unit may be configured to calculate a time period required for charging the electric power storage device in accordance with the received electric power information. The calculated time period may be used for setting the time schedule in the DC electric power supply facility.

In the vehicle according to the first aspect of the present disclosure, the electronic control unit may be configured to control the communication device to transmit a vehicle identification (ID) of the vehicle and an expected departure time to the server when the timer charging based on the DC charging is performed.

A second aspect of the present disclosure relates to a method of controlling a vehicle that enables external charging which is charging of a vehicle-mounted electric power storage device using electric power supplied from an electric power supply outside the vehicle. The vehicle includes an electronic control unit configured to enable both of alternating current (AC) charging that is the external charging using alternating current electric power supplied from an AC electric power supply facility as the electric power supply, and direct current (DC) charging that is the external charging using direct current electric power supplied from a DC electric power supply facility as the electric power supply. The DC electric power supply facility is configured to communicate with a server outside the vehicle. The method includes, by the electronic control unit, controlling the vehicle to set a time schedule in the vehicle without using the server when timer charging that is the external charging executed in accordance with the set time schedule is performed based on the AC charging; and, by the electronic control unit, controlling the vehicle to transmit data needed for setting the time schedule in the DC electric power supply facility to the server when the timer charging is performed based on the DC charging.

In the method according to the second aspect of the present disclosure, the electronic control unit may be configured to control a communication device to transmit a vehicle identification (ID) of the vehicle and an expected departure time to the server when the timer charging based on the DC charging is performed.

A third aspect of the present disclosure relates to a charging system including a vehicle that enables external charging which is charging of a vehicle-mounted electric power storage device using electric power supplied from an electric power supply outside the vehicle, a server outside the vehicle, and a direct current (DC) electric power supply facility as the electric power supply. The DC electric power supply facility is configured to supply direct current electric power to the vehicle through a charging cable. The vehicle includes a communication device and an electronic control unit. The communication device is configured to communicate with the server. The electronic control unit is configured to execute both of a process for alternating current (AC) charging that is the external charging using alternating current electric power supplied from an AC electric power supply facility as the electric power supply, and a process for DC charging that is the external charging using direct current electric power supplied from the DC electric power supply facility. The electronic control unit is configured to execute a process for timer charging that is the external charging executed in accordance with a set time schedule. The electronic control unit is configured to set the time schedule in the vehicle without using the server when the timer charging based on the AC charging is performed, and control the communication device to transmit data needed for setting the time schedule in the DC electric power supply facility to the server when the timer charging based on the DC charging is performed. The server is configured to transmit the data received from the vehicle to the DC electric power supply facility. The DC electric power supply facility is configured to execute a process for setting the time schedule using the data received from the server.

In the charging system according to the third aspect of the present disclosure, the server may be configured to register a vehicle identification (ID) assigned per vehicle and a DC electric power supply facility ID assigned per DC electric power supply facility corresponding to each vehicle ID.

In the charging system according to the third aspect of the present disclosure, the electronic control unit may be configured to control the communication device to transmit a vehicle ID of the vehicle and an expected departure time to the server when the timer charging based on the DC charging is performed.

In the charging system according to the third aspect of the present disclosure, the server may be configured to transmit the expected departure time received from the vehicle to the DC electric power supply facility that corresponds to the vehicle ID received from the vehicle.

In the charging system according to the third aspect of the present disclosure, the DC electric power supply facility may be configured to transmit a charging start signal and suppliable electric power information to the vehicle through the charging cable based on the expected departure time. The vehicle may be configured to calculate a required charging time period based on the suppliable electric power information and transmit the vehicle ID and the required charging time period to the server. The server may be configured fo transmit the required charging time period to the DC electric power supply facility. The DC electric power supply facility may be configured to determine a charging start time based on the required charging time period and the expected departure time and start a process for the DC charging when the charging start time is reached.

According to the aspects of the present disclosure, when the timer charging based on the AC charging is performed, the time schedule is set in the vehicle. Accordingly, the electronic control unit of the vehicle can be started in accordance with the time schedule, and the timer charging based on the AC charging can be realized. When the timer charging based on the DC charging is performed, the data needed for setting the time schedule in the DC electric power supply facility is transmitted to the server from the vehicle. According to the aspects of the present disclosure, then, the received data is transmitted to the DC electric power supply facility from the server, and the time schedule is set in the DC electric power supply facility. Thus, an electronic control unit of the DC electric power supply facility can be started in accordance with the time schedule. Consequently, according to the aspects of the present disclosure, the timer charging based on the AC charging and the timer charging based on the DC charging can be realized.

According to the aspects of the present disclosure, when electric power information that indicates the amount of electric power suppliable by the DC electric power supply facility in the DC charging is received from the DC electric power supply facility after the data is transmitted to the server, the electronic control unit is configured to calculate a time period required for charging the electric power storage device in accordance with the received electric power information. The calculated time period is used for setting the time schedule in the DC electric power supply facility.

According to the aspects of the present disclosure, the time period required for charging the electric power storage device is calculated in the vehicle. Thus, the vehicle does not need to transmit information on the vehicle side needed for calculating the time period (for example, information of the temperature, the state of charge (SOC), and the like of the electric power storage device) to the server. The electric power information indicating the amount of electric power suppliable by the DC electric power supply facility in the DC charging has a smaller amount of information than the information on the vehicle side. Thus, according to the aspects of the present disclosure, the amount of information that is communicated for calculating the time period required for charging the electric power storage device can be reduced.

According to the aspects of the present disclosure, a vehicle that can realize timer charging based on AC charging and also timer charging based on DC charging, a method of controlling the vehicle, and a charging system including the vehicle can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
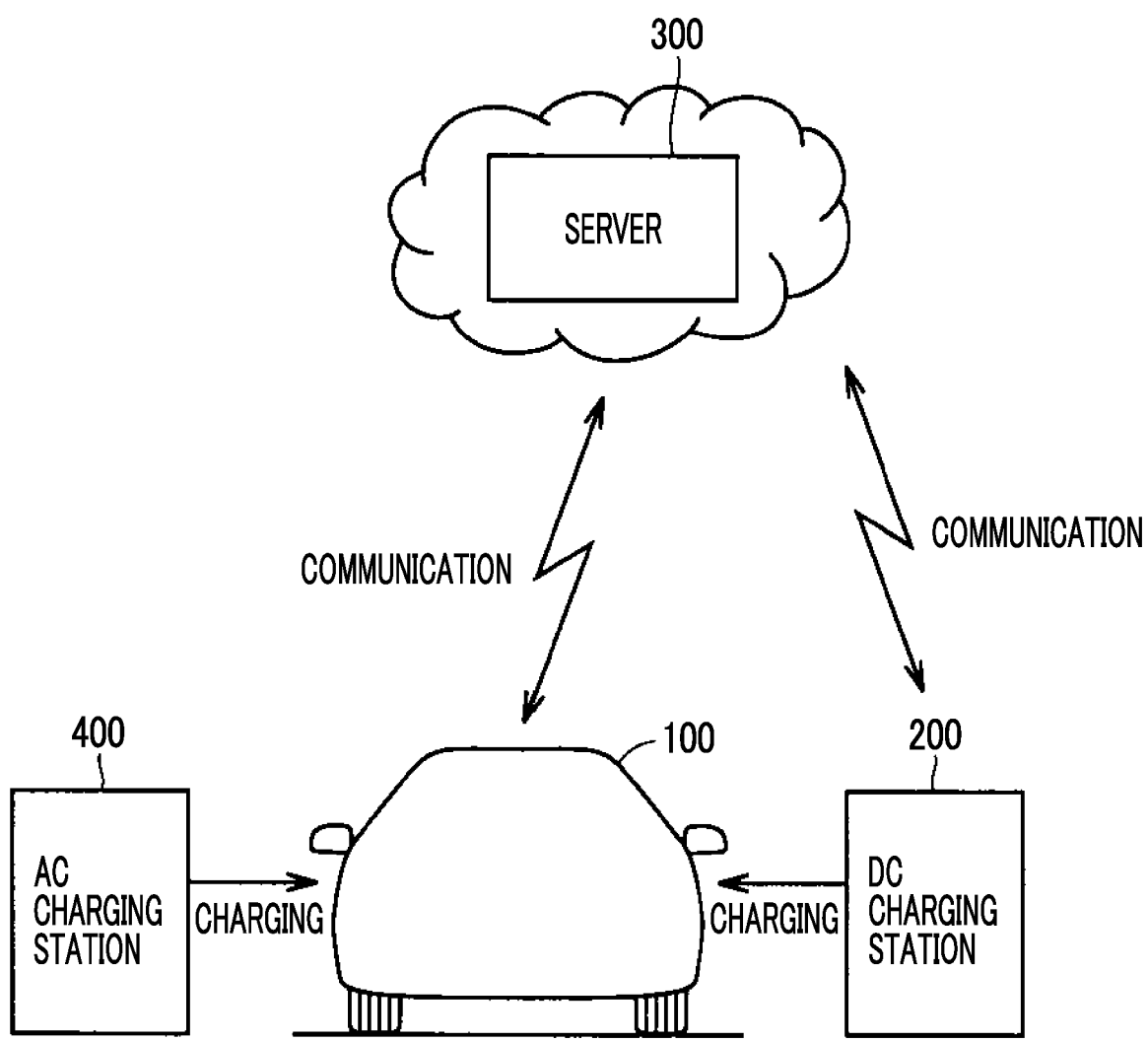
FIG. 1 is a diagram illustrating an overall configuration of a charging system.

Hereinafter, an embodiment will be described in detail with reference to the drawings. The same or corresponding parts in the drawings will be designated with the same reference signs, and descriptions of such parts will not be repeated.

Overall Configuration of Charging System

FIG. 1 is a diagram illustrating an overall configuration of a charging system 1 including a vehicle 100 according to the present embodiment. With reference to FIG. 1, the charging system 1 includes an AC charging station 400, a DC charging station 200, the vehicle 100, and a server 300.

The AC charging station 400 is configured to supply the vehicle 100 with alternating current electric power that is supplied from an alternating current electric power supply (for example, a system electric power supply) outside the AC charging station 400. The DC charging station 200 is configured to convert alternating current electric power supplied from an alternating current electric power supply outside the DC charging station 200 into direct current electric power, and supply the vehicle 100 with the converted direct current electric power.

The vehicle 100 is configured to enable external charging (AC charging) using alternating current electric power supplied from the AC charging station 400, and external charging (DC charging) using direct current electric power supplied from the DC charging station 200. The vehicle 100 is configured to enable timer charging that is external charging executed in accordance with a set time schedule. The vehicle 100 enables timer charging based on AC charging and timer charging based on DC charging. The time schedule in timer charging includes at least a charging start time. In timer charging, external charging is started when the charging start time included in the time schedule is reached. The time schedule is determined based on the charging start time or an expected departure time (hereinafter, referred to as "timer setting information") that is input into the vehicle 100 by a user. The expected departure time is a time at which the user next uses the vehicle 100.

The server 300 is configured to communicate with the vehicle 100 and the DC charging station 200. As will be described in detail below, the server 300 communicates with the vehicle 100 and the DC charging station 200 in order to realize timer charging based on DC charging. Hereinafter, the manner of realizing timer charging based on AC charging and timer charging based on DC charging in the vehicle 100 will be described in detail.

Detailed Configuration of Vehicle and Each Charging Station

Figure 2:
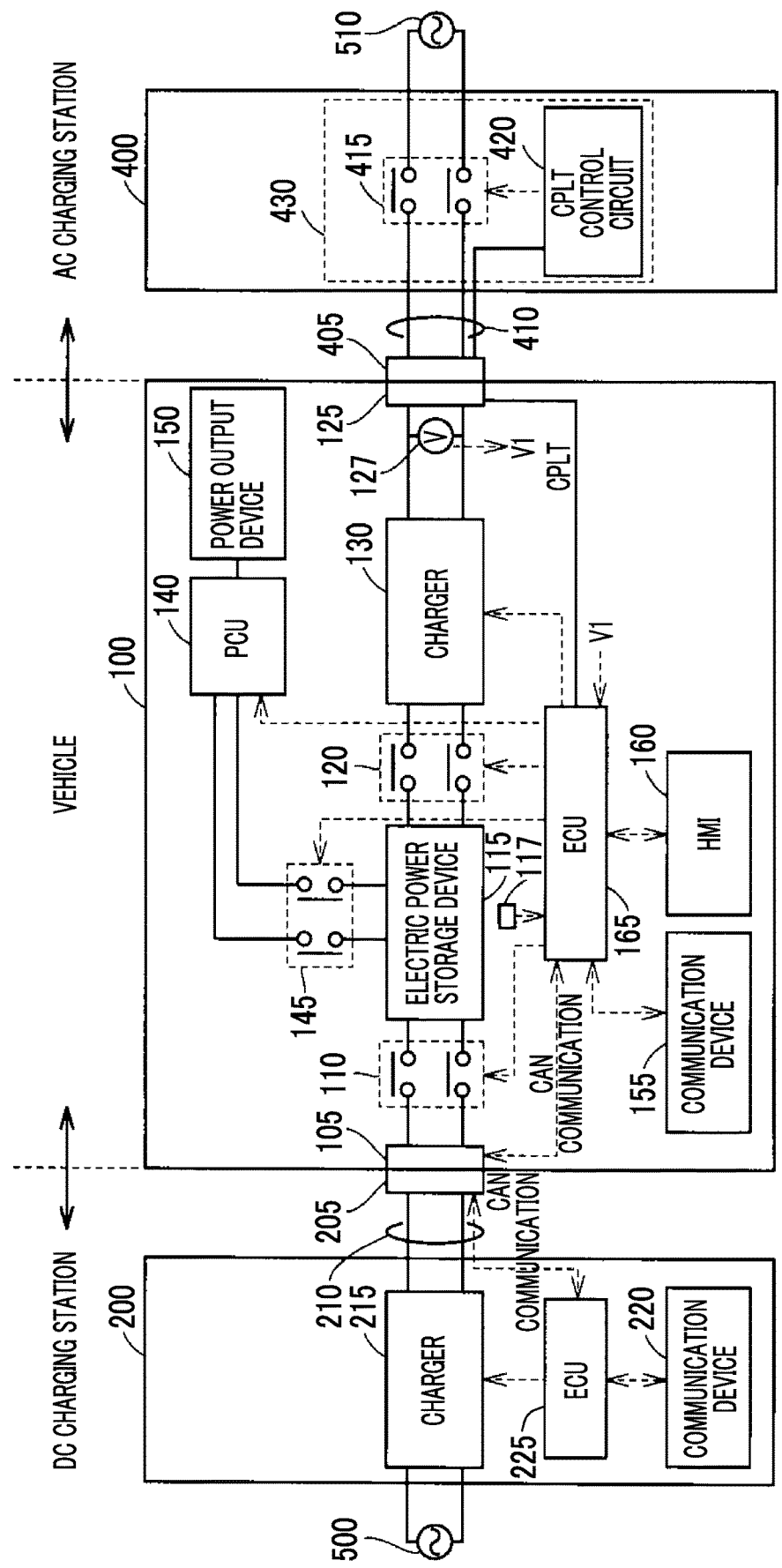
FIG. 2 is a diagram illustrating a detailed configuration of a vehicle, a DC charging station and an AC charging station.

FIG. 2 is a diagram illustrating a detailed configuration of the vehicle 100, the DC charging station 200, and the AC charging station 400. With reference to FIG. 2, the vehicle 100 is configured to be connected to the DC charging station 200 through a DC charging cable 210, and is configured to be connected to the AC charging station 400 through an AC charging cable 410.

The DC charging station 200 complies with the "CHAdeMO (registered trademark)" standard (hereinafter, referred to as the "CHAdeMO standard"). The CHAdeMO standard is an international standard for quick DC charging. The DC charging station 200 is configured to be supplied with alternating current electric power from an alternating current electric power supply 500 outside the DC charging station 200. The DC charging station 200 includes a charger 215, the DC charging cable 210, a communication device 220, and an electronic control unit (ECU) 225.

The charger 215 is configured to convert alternating current electric power supplied from the alternating current electric power supply 500 into direct current electric power. Direct current electric power converted by the charger 215 is supplied to the vehicle 100 through the DC charging cable 210.

The DC charging cable 210 is an electric power cable for supplying the vehicle 100 with direct current electric power converted by the charger 215. A DC charging connector 205 is disposed at the tip end of the DC charging cable 210. The DC charging connector 205 is configured to be connected to a DC charging inlet 105 (described later) of the vehicle 100.

The communication device 220 is configured to communicate with the server 300 (FIG. 1). As will be described in detail below, the communication device 220 communicates with the server 300 when timer charging based on DC charging is performed in the present embodiment.

The ECU 225 incorporates a central processing unit (CPU) and a memory that are not illustrated. The ECU 225 controls each device of the DC charging station 200 (for example, the charger 215 and the communication device 220) based on information stored in the memory or information from each sensor (not illustrated). The ECU 225 incorporates a timer and thus, can acquire the current time. The ECU 225 stores, in the internal memory, information that indicates the amount of electric power suppliable to the vehicle 100 by the DC charging station 200 (hereinafter, referred to as "suppliable electric power information").

The AC charging station 400 is configured to be supplied with alternating current electric power from an alternating current electric power supply 510 outside the AC charging station 400. The AC charging station 400 includes electric vehicle supply equipment (EVSE) 430 and the AC charging cable 410.

The EVSE 430 is connected to the alternating current electric power supply 510. While the EVSE 430 is disposed in the AC charging station 400, the EVSE 430 may be disposed in the middle of the AC charging cable 410. The EVSE 430 controls supply/cut-off of electric power to the vehicle 100 through the AC charging cable 410 from the alternating current electric power supply 510. For example, the EVSE 430 complies with the United States of America SAE standard "SAE J1772 (SAE Electric Vehicle Conductive Charge Coupler)". For example, the AC charging station 400 has specifications for supplying the vehicle 100 with electric power having a voltage of 100 V, or specifications for supplying the vehicle 100 with electric power having a voltage of 200 V.

The EVSE 430 includes a charging circuit interrupt device (CCID) 415 and a CPLT control circuit 420. The CCID 415 is a relay that is disposed on an electric power supply path to the vehicle 100 from the alternating current electric power supply 510.

The CPLT control circuit 420 generates a pilot signal CPLT that is communicated to an ECU 165 (described later) of the vehicle 100. The CPLT control circuit 420 outputs the generated pilot signal CPLT to the ECU 165 through a dedicated signal line that is included in the AC charging cable 410. The electric potential of the pilot signal CPLT is controlled by the ECU 165. The CPLT control circuit 420 controls the CCID 415 based on the electric potential of the pilot signal CPLT. That is, the ECU 165 can remotely operate the CCID 415 by controlling the electric potential of the pilot signal CPLT.

The AC charging cable 410 is an electric power cable for supplying the vehicle 100 with alternating current electric power supplied from the alternating current electric power supply 510. An AC charging connector 405 is disposed at the tip end of the AC charging cable 410. The AC charging connector 405 is configured to be connected to an AC charging inlet 125 (described later) of the vehicle 100.

The vehicle 100 includes the DC charging inlet 105, the AC charging inlet 125, a voltage sensor 127, a charger 130, an electric power storage device 115, a monitoring unit 117, relays 110, 120, 145, a power control unit (PCU) 140, a power output device 150, a communication device 155, a human machine interface (HMI) 160, and the ECU 165.

The DC charging inlet 105 is configured to receive connection of the DC charging connector 205 that is disposed in the DC charging cable 210. Direct current electric power is supplied to the vehicle 100 from the DC charging station 200 in a state where the DC charging connector 205 is connected to the DC charging inlet 105.

The AC charging inlet 125 is configured to receive connection of the AC charging connector 405 that is disposed in the AC charging cable 410. Alternating current electric power is supplied to the vehicle 100 from the AC charging station 400 in a state where the AC charging connector 405 is connected to the AC charging inlet 125.

The voltage sensor 127 is configured to detect a voltage that is applied to the AC charging inlet 125 from the AC charging station 400. The detection result of the voltage sensor 127 is output to the ECU 165.

The charger 130 is configured to convert alternating current electric power received by the AC charging inlet 125 into direct current electric power having the charge voltage of the electric power storage device 115. Direct current electric power converted by the charger 130 is supplied to the electric power storage device 115.

The relay 110 is connected between the DC charging inlet 105 and the electric power storage device 115. The relay 120 is connected between the charger 130 and the electric power storage device 115. Opening and closing of the relays 110, 120 are controlled by the ECU 165. When DC charging is performed, the relay 110 is closed, and the relay 120 is open. When AC charging is performed, the relay 120 is closed, and the relay 110 is open.

The electric power storage device 115 is an electric power storage component that is configured to be capable of being charged or discharged. For example, the electric power storage device 115 is configured to include a secondary battery such as a lithium ion battery, a nickel-hydrogen battery, or a lead-acid battery, or an electric power storage element such as an electric double-layer capacitor. When DC charging is performed, the electric power storage device 115 is charged with direct current electric power supplied from the DC charging inlet 105. When AC charging is performed, the electric power storage device 115 is charged with direct current electric power supplied from the charger 130.

The monitoring unit 117 is configured to detect the voltage, the current, and the temperature of the electric power storage device 115. The detection result of the monitoring unit 117 is output to the ECU 165.

The PCU 140 is a general illustration of an electric power conversion device for driving the power output device 150 by receiving electric power from the electric power storage device 115. For example, the PCU 140 includes an inverter for driving a motor included in the power output device 150, a converter for stepping up a direct current voltage supplied to the inverter to or above the voltage of the electric power storage device 115, and the like.

The power output device 150 is a general illustration of a device that outputs power for driving a drive wheel (not illustrated). For example, the power output device 150 includes the motor that drives the drive wheel.

The relay 145 is connected between the PCU 140 and the electric power storage device 115. Opening and closing of the relay 145 are controlled by the ECU 165. The relay 145 is open during DC charging and AC charging.

The communication device 155 is configured to communicate with the server 300 (FIG. 1). As will be described in detail below, the communication device 155 communicates with the server 300 when timer charging based on DC charging is performed in the vehicle 100 according to the present embodiment.

The HMI 160 is configured to receive input related to operation of the vehicle 100 from the user. For example, the user inputs information needed for calculating the time schedule in timer charging (timer setting information), and the type of charging (AC charging or DC charging) through the HMI 160. For example, the HMI 160 includes a display and a speaker that are disposed in the vehicle cabin. Other well-known devices, for example, a display and a speaker of a navigation device (not illustrated), may be used in the HMI 160.

The ECU 165 incorporates a CPU and a memory that are not illustrated. The ECU 165 controls each device of the vehicle 100 (for example, the relays 110, 120, 145, the charger 130, the PCU 140, the communication device 155, and the HMI 160) based on information stored in the memory or information from each sensor (not illustrated).

The ECU 165 incorporates a timer and thus, can acquire the current time. The ECU 165 stores a vehicle ID for specifying the vehicle 100 in the internal memory. The vehicle ID will be described below. For example, the ECU 165 estimates the state of charge (SOC) of the electric power storage device 115 by cumulating the current value in the output of the monitoring unit 117.

For example, the ECU 165 is configured to perform controller area network (CAN) communication with the ECU 225 of the DC charging station 200 through the DC charging cable 210. In the CHAdeMO standard, CAN communication is established between the ECUs 165, 225 after a charging start signal for starting charging is transmitted to the ECU 165 (vehicle 100) from the ECU 225 (DC charging station 200), and DC charging is enabled. That is, in the CHAdeMO standard, the ECU 225 (DC charging station side) can request the ECU 165 (vehicle side) to start DC charging, but the ECU 165 (vehicle side) cannot request the ECU 225 (DC charging station side) to start DC charging.

As described above, the ECU 165 is configured to remotely operate the CCID 415 by controlling the electric potential of the pilot signal CPLT that is communicated through the AC charging cable 410. That is, the ECU 165 (vehicle side) can request the AC charging station 400 to start AC charging. The voltage that is applied to the AC charging inlet 125 from the AC charging station 400 is detected by the voltage sensor 127 after the CCID 415 is closed. The ECU 165 is configured to detect the voltage applied to the AC charging inlet 125 from the AC charging station 400 by receiving the output of the voltage sensor 127.

Configuration of Server

Figure 3:
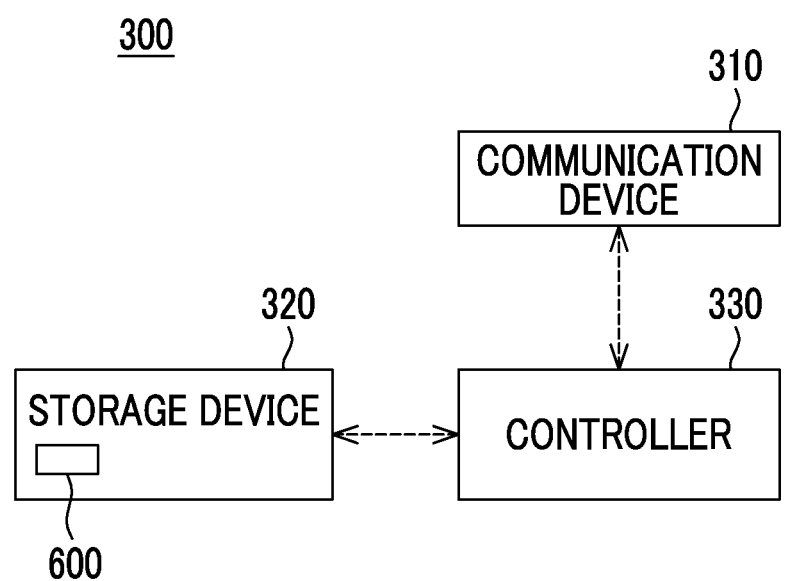
FIG. 3 is a diagram illustrating a configuration of a server illustrated in FIG. 1.

FIG. 3 is a diagram illustrating a configuration of the server 300 illustrated in FIG. 1. With reference to FIG. 3, the server 300 includes a communication device 310, a storage device 320, and a controller 330.

The communication device 310 is configured to communicate with the vehicle 100 and the DC charging station 200. As will be described in detail below, the communication device 310 communicates with the vehicle 100 and the DC charging station 200 when timer charging based on DC charging is performed. The communication device 310 outputs received data to the controller 330.

The storage device 320 is configured to store a database 600. For example, an association between the vehicle 100 and the DC charging station 200 in a house of the user of the vehicle 100 is registered in the database 600. For example, registration in the database 600 is performed in advance by each vehicle user.

Figure 4:
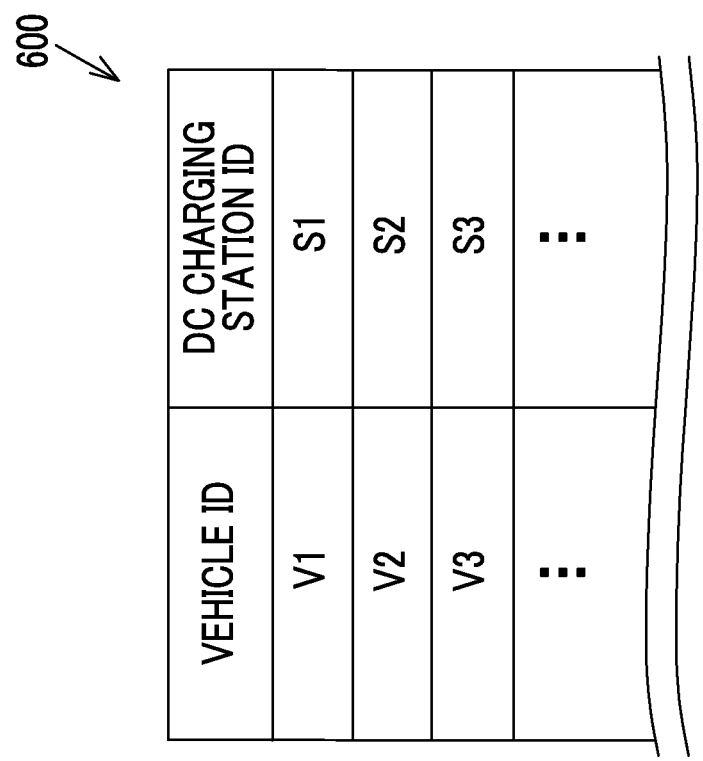
FIG. 4 is a diagram illustrating one example of a database.

FIG. 4 is a diagram illustrating one example of the database 600. With reference to FIG. 4, an association between the vehicle ID and a DC charging station ID is registered in the database 600. An ID is assigned to each vehicle 100 and each DC charging station 200. The controller 330 can determine which DC charging station 200 (DC charging station ID) corresponds to the vehicle 100 (vehicle ID) by referencing the database 600.

With reference to FIG. 3 again, the controller 330 incorporates a CPU and a memory that are not illustrated. The controller 330 executes a process in accordance with a control program that is stored in the memory. For example, by referencing the database 600, the controller 330 controls the communication device 310 to transmit data received from the vehicle 100 to the DC charging station 200 that corresponds to the vehicle 100 transmitting the data.

Realization of Timer Charging Based on AC Charging/DC Charging

As described above, for example, in AC charging, the charger 130 in the vehicle 100 converts alternating current electric power supplied from the AC charging station 400 into direct current electric power. For example, in DC charging, the charger 215 in the DC charging station 200 converts alternating current electric power supplied from the alternating current electric power supply 500 outside the DC charging station 200 into direct current electric power.

AC charging can be started by the ECU 165 that controls the charger 130 in the vehicle 100 on the vehicle side. Specifically, as described above, the ECU 165 can remotely operate the CCID 415 by controlling the electric potential of the pilot signal CPLT communicated through the AC charging cable 410, and start AC charging by controlling the charger 130.

DC charging can be started by the ECU 225 that controls the charger 215 in the DC charging station 200 on the DC charging station side. Specifically, as described above, the ECU 225 can establish CAN communication between the ECUs 225, 165 by transmitting the charging start signal to the ECU 165 of the vehicle 100, and start DC charging by controlling the charger 215.

As described above, when timer charging is performed, the location of the ECU that should be started in accordance with the time schedule is different between AC charging and DC charging. Specifically, when AC charging is performed, the ECU 165 of the vehicle 100 needs to be started. When DC charging is performed, the ECU 225 of the DC charging station 200 needs to be started.

In the vehicle 100 according to the present embodiment, when timer charging based on AC charging is performed, the ECU 165 sets the time schedule in the vehicle 100 without using the server 300. When timer charging based on DC charging is performed, the ECU 165 controls the communication device 155 to transmit data needed for setting the time schedule in the DC charging station 200 (for example, the timer setting information) to the server 300.

Then, when timer charging based on DC charging is performed in the vehicle 100, the data received in the server 300 is transmitted to the DC charging station 200 from the server 300, and the time schedule is set in the DC charging station 200. Thus, the ECU 225 of the DC charging station 200 can be started when the charging start time is reached. When timer charging based on AC charging is performed, the time schedule is set in the vehicle 100. Thus, the ECU 165 of the vehicle 100 can be started when the charging start time is reached. Consequently, the vehicle 100 can realize timer charging based on AC charging and also timer charging based on DC charging.

Figure 5:
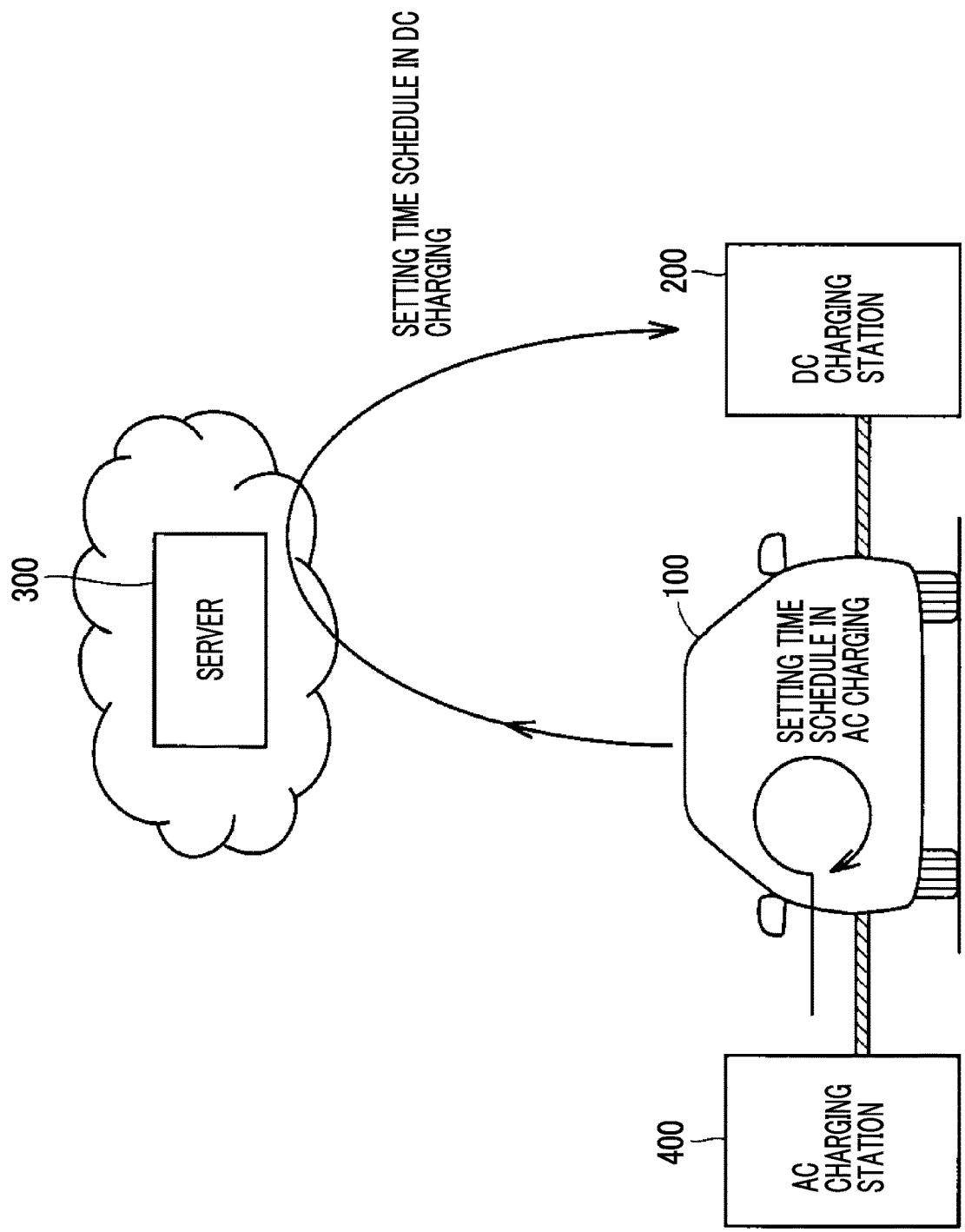
FIG. 5 is a diagram illustrating an image of a procedure of setting a time schedule in each timer charging.

FIG. 5 is a diagram illustrating an image of a procedure of setting the time schedule in each timer charging. With reference to FIG. 5, when timer charging based on AC charging is performed, the vehicle 100 detects the charge voltage applied from the AC charging station 400 and sets the time schedule in the vehicle 100. Specifically, in the vehicle 100, the ECU 165 (FIG. 2) remotely operates the CCID 415 to be closed and detects the voltage of the AC charging station 400. The ECU 165 derives charging electric power from the detected charge voltage. For example, the ECU 165 stores charging electric power (or charge current) for each charge voltage in advance in the internal memory. For example, the ECU 165 calculates the charging start time for completing charging of the electric power storage device 115 before the expected departure time, in accordance with the derived charging electric power and the expected departure time that is input through the HMI 160 by the user. The ECU 165 stores the calculated charging start time in the internal memory. Accordingly, setting of the time schedule in timer charging based on AC charging is completed.

When timer charging based on DC charging is performed, the vehicle 100 transmits data needed for setting the time schedule in the DC charging station 200 (for example, the timer setting information) to the server 300. Then, the received data is transmitted to the DC charging station 200 from the server 300, and the time schedule is set in the DC charging station 200. Specifically, the ECU 225 (FIG. 2) calculates the charging start time using the received data and the like. The ECU 225 stores the calculated charging start time in the internal memory. Accordingly, setting of the time schedule in timer charging based on DC charging is completed.

Accordingly, the vehicle 100 can realize timer charging based on AC charging and timer charging based on DC charging.

Process Procedure of Timer Charging

Figure 6:
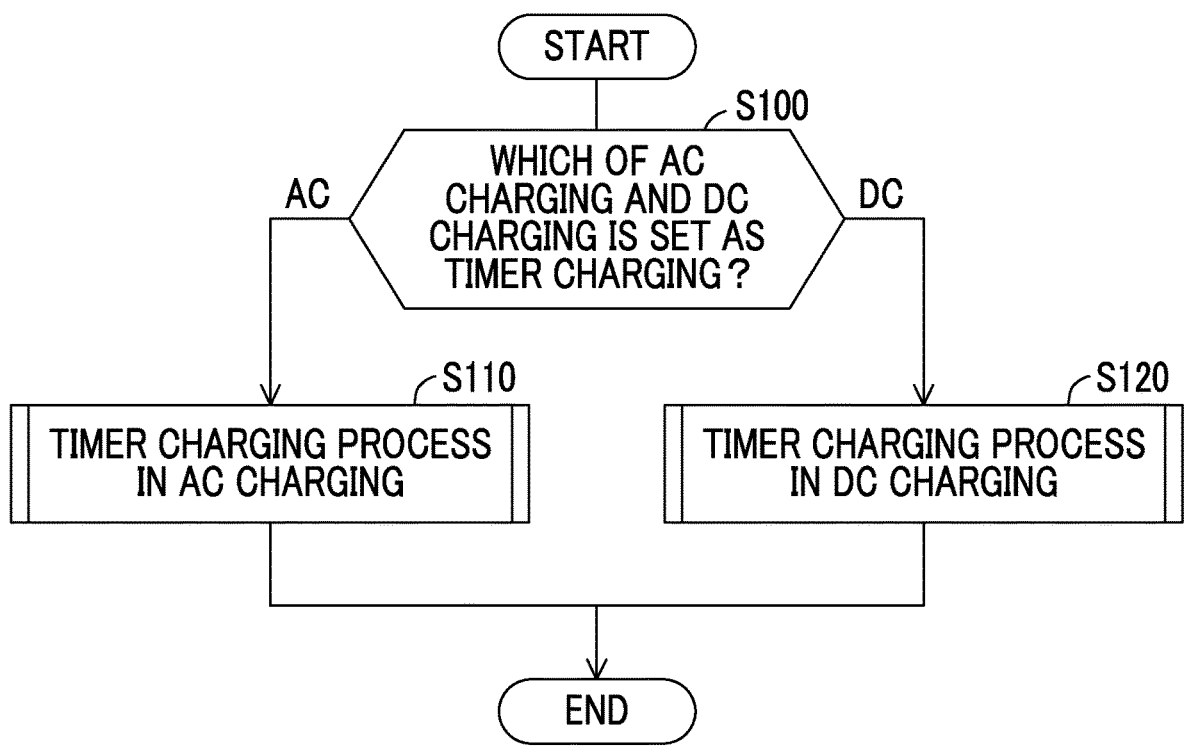
FIG. 6 is a flowchart illustrating a process procedure of timer charging in a vehicle.

FIG. 6 is a flowchart illustrating a process procedure of timer charging in the vehicle 100. The process illustrated in the flowchart in FIG. 6 is executed after an instruction to perform timer charging is provided by the user in a state where the DC charging cable 210 or the AC charging cable 410 is connected to the vehicle 100.

With reference to FIG. 6, the ECU 165 determines whether an instruction to perform timer charging based on AC charging or timer charging based on DC charging is provided through the HMI 160 (step S100). When the ECU 165 determines that an instruction to perform timer charging based on AC charging is provided ("AC" in step S100), the ECU 165 executes a timer charging process based on AC charging (step S110).

When the ECU 165 determines that an instruction to perform timer charging based on DC charging is provided ("DC" in step S100), the ECU 165 executes a timer charging process based on DC charging (step S120). In the timer charging process based on DC charging, processes are executed in the vehicle 100 and also in the DC charging station 200 and the server 300. Details of each timer charging process will be described.

Figure 7:
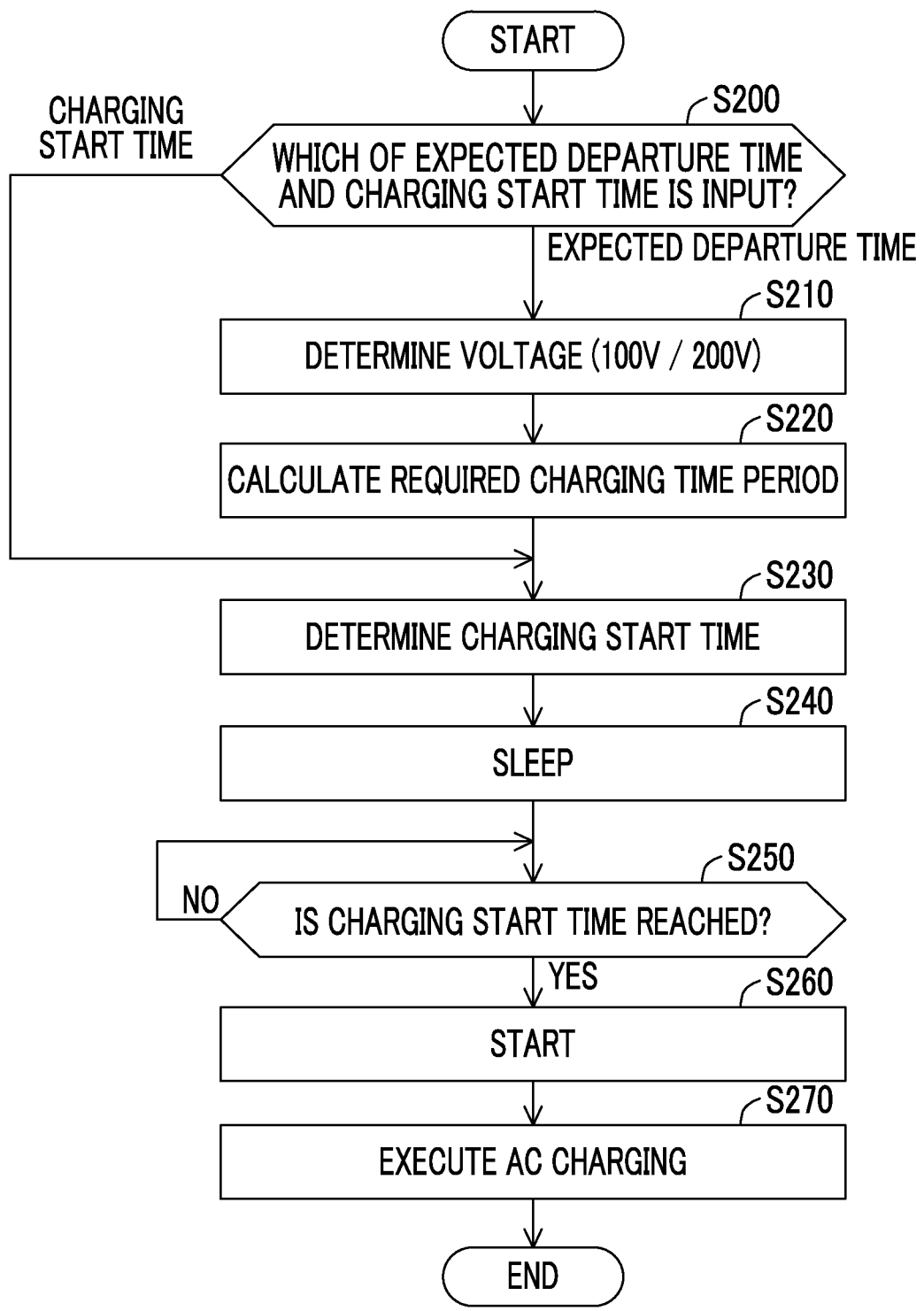
FIG. 7 is a flowchart illustrating a timer charging process using AC charging.

FIG. 7 is a flowchart illustrating the timer charging process based on AC charging. The process illustrated in the flowchart in FIG. 7 is executed in step S110 in FIG. 6.

With reference to FIG. 7, the ECU 165 determines whether the expected departure time or the charging start time is input through the HMI 160 by the user (step S200). When the ECU 165 determines that the expected departure time is input, the ECU 165 remotely operates the CCID 415 to be closed and determines whether the voltage applied to the AC charging inlet 125 from the AC charging station 400 is 100 V or 200 V by receiving the detection result of the voltage sensor 127 (step S210).

The ECU 165 calculates a time period required for charging the electric power storage device 115 (hereinafter, referred to as a "required charging time period") based on the determined voltage of the AC charging station 400 and information indicating the state of the electric power storage device 115 (the SOC, the battery temperature, and the like) (step S220).

After the ECU 165 in step S200 determines that the charging start time is input ("CHARGING START TIME" in step S200), or after the ECU 165 calculates the required charging time period in step S220, the ECU 165 determines the charging start time based on the charging start time input by the user or the calculated required charging time period (step S230).

Then, the ECU 165 transitions to a sleep state (step S240). In the sleep state, main functions of the ECU 165 are stopped, but the function of determining whether or not the charging start time is reached is being operated. The ECU 165 remotely operates the CCID 415 to be opened before transitioning to the sleep state.

In the sleep state, the ECU 165 determines whether or not the charging start time is reached (step S250). When the ECU 165 determines that the charging start time is not reached (NO in step S250), the ECU 165 continues monitoring whether or not the charging start time is reached.

When the ECU 165 determines that the charging start time is reached (YES in step S250), the ECU 165 is started (step S260). That is, the ECU 165 operates the main functions stopped in the sleep state. Then, the ECU 165 executes a process for AC charging (step S270), and the process transitions to END by completion of AC charging. For example, the process for AC charging includes remotely operating the CCID 415 to be closed and controlling the charger 130 to set the charging electric power to be equal to target electric power.

As described above, the timer charging process based on AC charging is completed with merely the vehicle 100. Meanwhile, timer charging based on DC charging is not completed with merely the vehicle 100. Timer charging based on DC charging is realized by cooperation among the vehicle 100, the DC charging station 200, and the server 300.

Figure 8:
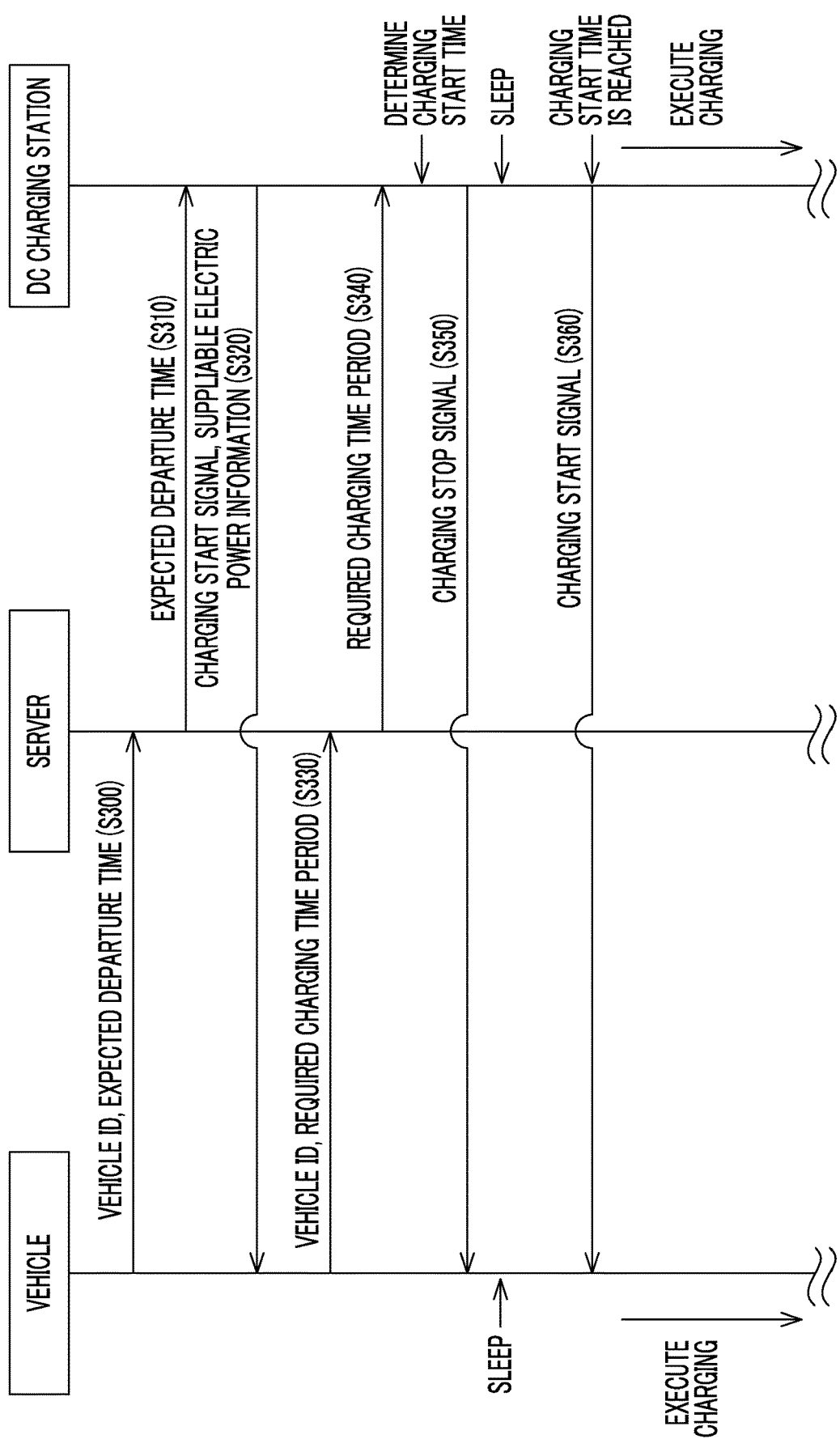
FIG. 8 is a sequence diagram for describing one example of cooperation among the vehicle, the server, and the DC charging station in a timer charging process using DC charging.

FIG. 8 is a sequence diagram for describing one example of cooperation among the vehicle 100, the server 300, and the DC charging station 200 in the timer charging process based on DC charging. With reference to FIG. 8, processes of the vehicle 100, the server 300, and the DC charging station 200 are illustrated from the left. In the example, it is assumed that the user does not input the charging start time and inputs the expected departure time through the HMI 160. It is also assumed that the DC charging connector 205 is connected to the DC charging inlet 105.

In order to realize timer charging based on DC charging, the vehicle 100 transmits the vehicle ID stored in the internal memory of the ECU 165, and the expected departure time input through the HMI 160 by the user to the server 300 (step S300). The server 300 transmits the received expected departure time to the DC charging station 200 that is associated with the received vehicle ID in the database 600 (FIG. 4) (step S310). When the user inputs the charging start time through the HMI 160, the charging start time instead of the expected departure time is transmitted to the DC charging station 200 through steps S300, S310, and the charging start time is determined in the DC charging station 200. Then, the process transitions to step S350.

The DC charging station 200 transmits the charging start signal and the suppliable electric power information to the vehicle 100 through the DC charging cable 210 (step S320). When the vehicle 100 receives the charging start signal, the ECU 165 calculates the required charging time period based on the amount of electric power suppliable by the DC charging station 200, and the vehicle 100 transmits the vehicle ID and the calculated required charging time period to the server 300 (step S330).

The server 300 transmits the received required charging time period to the DC charging station 200 corresponding to the vehicle ID (step S340). In the DC charging station 200, the charging start time is determined based on the received required charging time period. The DC charging station 200 transmits a charging stop signal to the vehicle 100 (step S350). Accordingly, the DC charging station 200 and the vehicle 100 transition to the sleep state. In the sleep state, main functions of the ECU 225 of the DC charging station 200 are stopped, but the function of monitoring whether or not the charging start time is reached is being operated. In the sleep state, main functions of the ECU 165 of the vehicle 100 are stopped, but the function of monitoring whether or not the charging start signal is received is being operated.

Then, when the charging start time is reached, the ECU 225 is started, and the DC charging station 200 transmits the charging start signal to the vehicle 100 (step S360). When the vehicle 100 receives the charging start signal, the ECU 165 is started, and then, DC charging is started between the vehicle 100 and the DC charging station 200.

As described above, timer charging based on DC charging is realized by cooperation among the vehicle 100, the server 300, and the DC charging station 200. Next, a specific process procedure in each of the vehicle 100, the server 300, and the DC charging station 200 in timer charging based on DC charging will be described.

Figure 9:
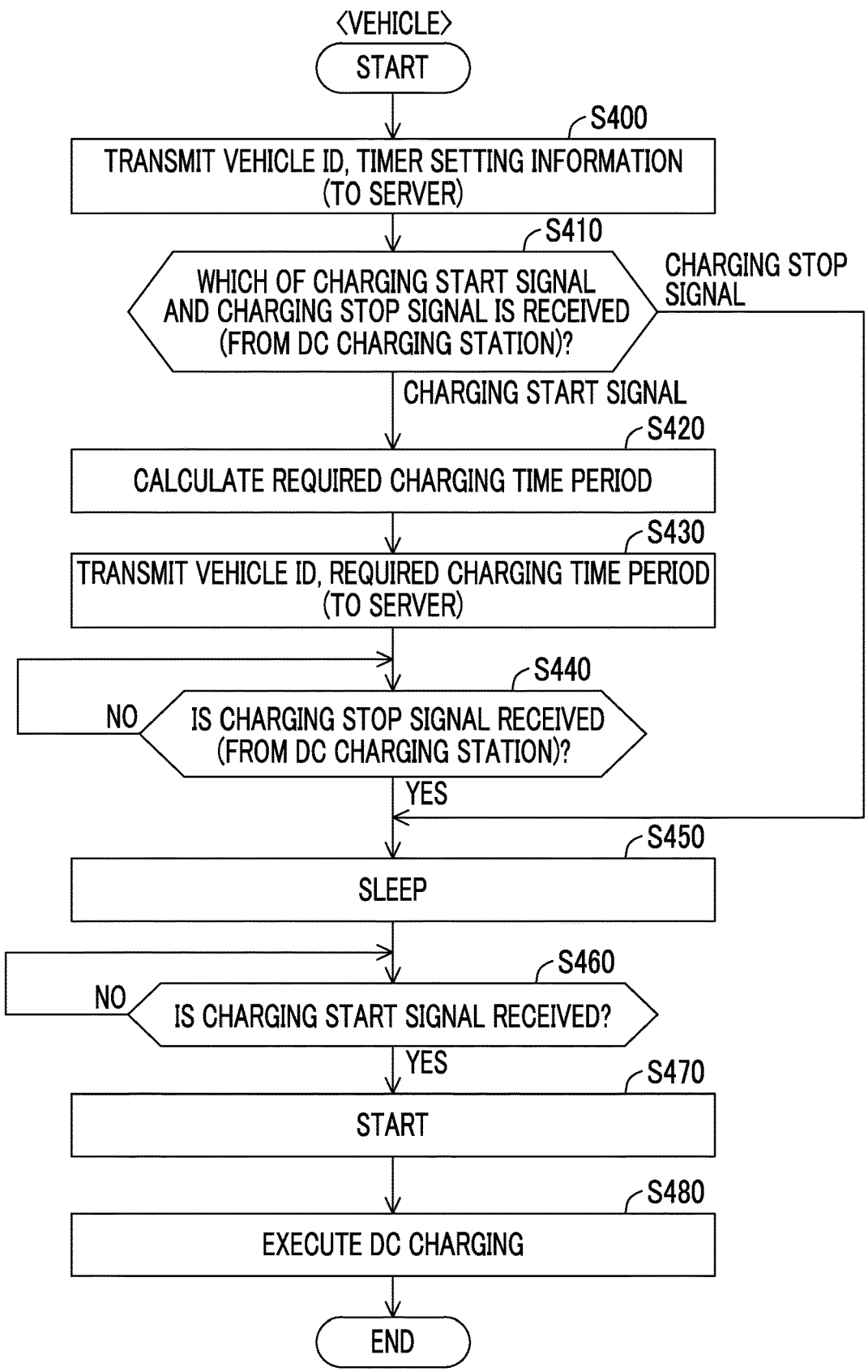
FIG. 9 is a flowchart illustrating a process procedure that is executed in the vehicle for timer charging based on DC charging.

FIG. 9 is a flowchart illustrating a process procedure that is executed in the vehicle 100 for timer charging based on DC charging. The process illustrated in the flowchart in FIG. 9 is executed in step S120 in FIG. 6.

With reference to FIG. 9, the ECU 165 controls the communication device 155 to transmit the vehicle ID stored in the internal memory and the timer setting information input through the HMI 160 by the user to the server 300 (step S400).

The ECU 165 monitors whether the charging start signal or the charging stop signal is received from the DC charging station 200 (step S410). For example, when the expected departure time is transmitted to the server 300 in step S400, the ECU 165 receives the charging start signal and the suppliable electric power information of the DC charging station 200 (step S320 in FIG. 8). When the charging start time is transmitted to the server 300 in step S400, exchange of data for calculating the charging start time can be omitted. Thus, the ECU 165 receives the charging stop signal (corresponds to step S350 in FIG. 8).

When the ECU 165 confirms that the charging start signal is received ("CHARGING START SIGNAL" in step S410), the ECU 165 calculates the required charging time period based on the charging start signal, the received suppliable electric power information of the DC charging station 200, and information indicating the state of the electric power storage device 115 (the SOC, the battery temperature, and the like) (step S420). Then, the ECU 165 controls the communication device 155 to transmit the vehicle ID and the calculated required charging time period to the server 300 (step S430).

As described above, the required charging time period is calculated in the vehicle 100 in the present embodiment. Thus, the vehicle 100 does not need to transmit information and the like indicating the state of the electric power storage device 115 to the server 300. The suppliable electric power information has a smaller amount of information than information indicating the state of the electric power storage device 115. Thus, the vehicle 100 according to the present embodiment can reduce the amount of information communicated for calculating the required charging time period.

When the required charging time period is transmitted to the server 300 in step S430, the ECU 165 monitors whether or not the charging stop signal is received from the DC charging station 200 (step S440). When the ECU 165 confirms that the charging stop signal is not received (NO in step S440), the ECU 165 continues monitoring whether or not the charging stop signal is received.

When the ECU 165 confirms that the charging stop signal is received (YES in step S440), the ECU 165 transitions to the sleep state (step S450). In the sleep state, main functions of the ECU 165 are stopped, but the function of monitoring whether or not the charging start signal is received is being operated.

In the sleep state, the ECU 165 monitors whether or not the charging start signal is received (step S460). When the ECU 165 confirms that the charging start signal is not received (NO in step S460), the ECU 165 continues monitoring whether or not the charging start signal is received.

When the ECU 165 confirms that the charging start signal is received (YES in step S460), the ECU 165 is started (step S470). That is, the ECU 165 operates the main functions stopped in the sleep state. Then, the ECU 165 executes a process for DC charging (step S480), and the process transitions to END by completion of DC charging. For example, the process for DC charging includes a process of closing the relay 110 and a process of transmitting target electric power information to the ECU 225 by CAN communication.

Figure 10:
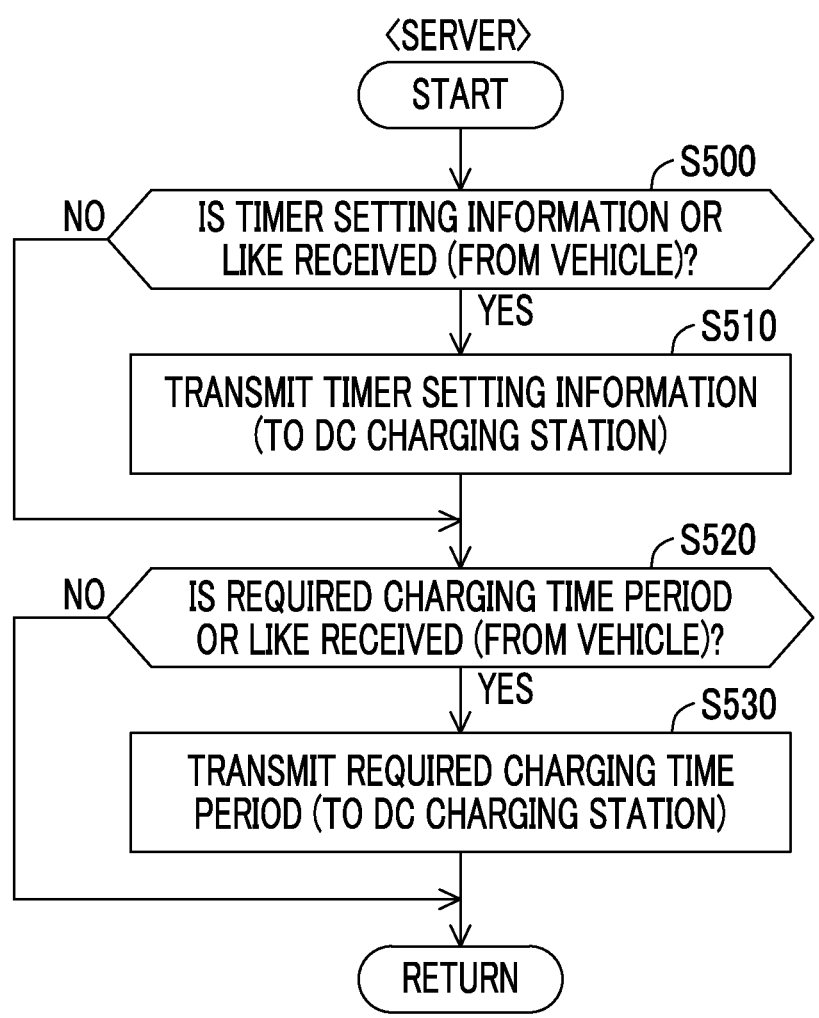
FIG. 10 is a flowchart illustrating a process procedure that is executed in the server for timer charging based on DC charging.

FIG. 10 is a flowchart illustrating a process procedure that is executed in the server 300 for timer charging based on DC charging. The process illustrated in the flowchart in FIG. 10 is executed at predetermined cycles during operation of the server 300.

With reference to FIG. 10, the controller 330 determines whether or not the vehicle ID and the timer setting information are received from the vehicle 100 (step S500). When the controller 330 determines that the vehicle ID and the timer setting information are received (YES in step S500), the controller 330 controls the communication device 310 to transmit the received timer setting information to the DC charging station 200 that is associated with the received vehicle ID in the database 600 (FIG. 4) (step S510).

When the controller 330 in step S500 determines that the vehicle ID and the timer setting information are not received (NO in step S500), or when the timer setting information is transmitted to the DC charging station 200 in step S510, the controller 330 determines whether or not the vehicle ID and the required charging time period are received from the vehicle 100 (step S520). When the controller 330 determines that the vehicle ID and the required charging time period are received (YES in step S520), the controller 330 controls the communication device 310 to transmit the received required charging time period to the DC charging station 200 corresponding to the vehicle ID (step S530). When the controller 330 in step S520 determines that the vehicle ID and the required charging time period are not received (NO in step S520), or when the required charging time period is transmitted to the DC charging station 200 in step S530, the process transitions to RETURN.

Figure 11:
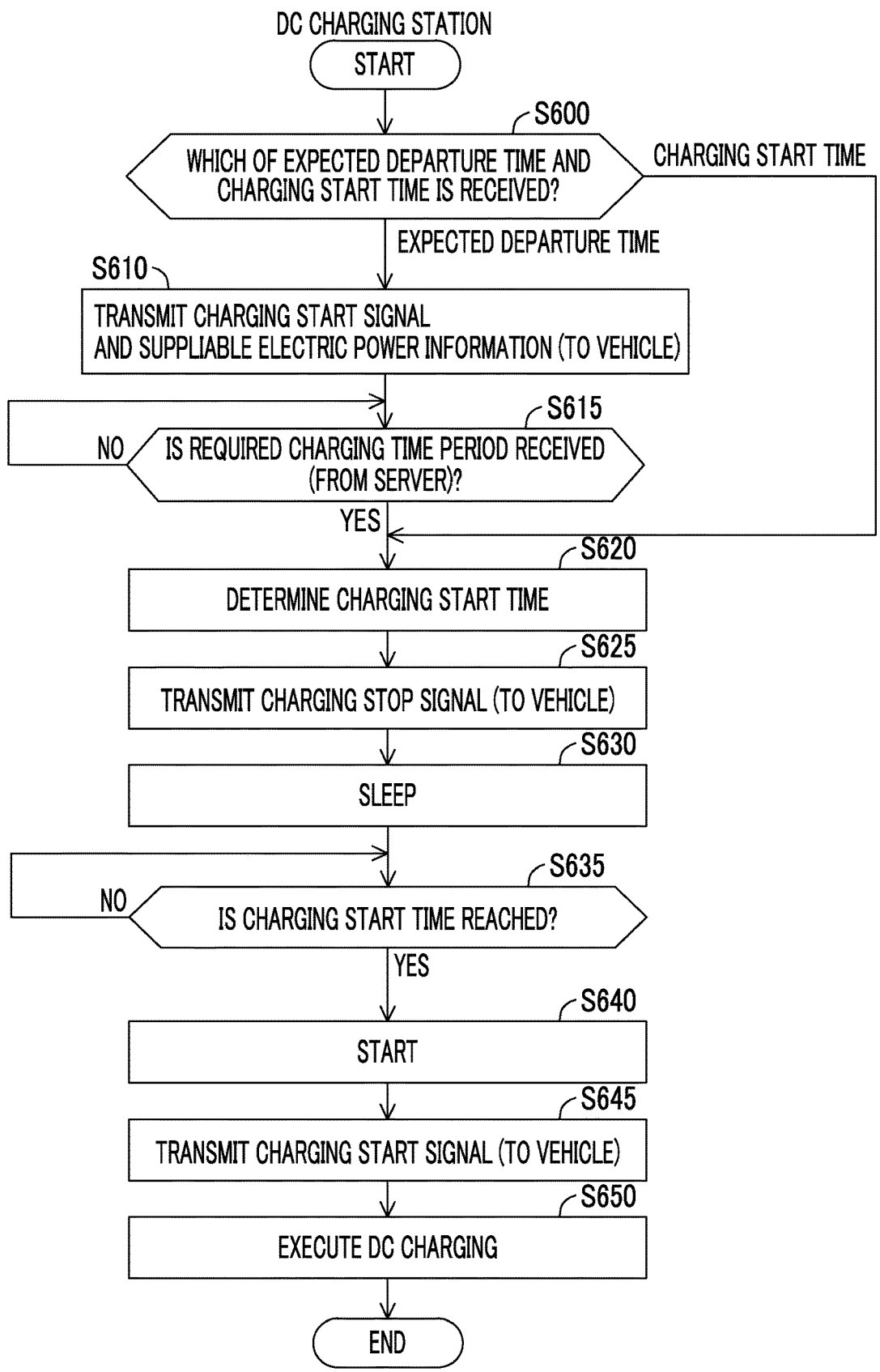
FIG. 11 is a flowchart illustrating a process procedure that is executed in the DC charging station for timer charging based on DC charging.

FIG. 11 is a flowchart illustrating a process procedure that is executed in the DC charging station 200 for timer charging based on DC charging. The process illustrated in the flowchart in FIG. 11 is executed in the DC charging station 200 after the DC charging station 200 receives the timer setting information from the server 300 (corresponds to step S310 in FIG. 8).

With reference to FIG. 11, the ECU 225 determines whether the received timer setting information is the expected departure time or the charging start time (step S600). When the ECU 225 determines that the received timer setting information is the expected departure time ("EXPECTED DEPARTURE TIME" in step S600), the ECU 225 establishes CAN communication between the ECUs 225, 165 by transmitting the charging start signal to the ECU 165 through the DC charging cable 210, and transmits the suppliable electric power information to the ECU 165 through the DC charging cable 210 (step S610).

The ECU 225 determines whether or not the required charging time period is received from the server 300 (step S615). When the ECU 225 determines that the required charging time period is not received (NO in step S615), the ECU 225 continues monitoring whether or not the required charging time period is received.

When the ECU 225 in step S615 determines that the required charging time period is received (YES in step S615), or when the ECU 225 in step S600 determines that the timer setting information is the charging start time (NO in step S600), the ECU 225 determines the charging start time based on the received information (step S620).

Then, the ECU 225 transmits the charging stop signal to the vehicle 100 through the DC charging cable 210 (step S625) and transitions to the sleep state (step S630). In the sleep state, main functions of the ECU 225 are stopped, but the function of monitoring whether or not the charging start time is reached is being operated.

In the sleep state, the ECU 225 determines whether or not the charging start time is reached (step S635). When the ECU 225 determines that the charging start time is not reached (NO in step S635), the ECU 225 continues monitoring whether or not the charging start time is reached.

When the ECU 225 determines that the charging start time is reached (YES in step S635), the ECU 225 is started (step S640). That is, the ECU 225 operates the main functions stopped in the sleep state. Then, the ECU 225 transmits the charging start signal to the vehicle 100 (step S645). The ECU 225 executes a process for DC charging (step S650), the process transitions to END by completion of the DC charging. For example, the process for DC charging that is executed in the DC charging station 200 includes a process of controlling the charger 215 to supply the vehicle 100 with the target electric power indicated by the target electric power information transmitted from the vehicle 100.

As described heretofore, in the vehicle 100 according to the present embodiment, when timer charging based on AC charging is performed, the ECU 165 sets the time schedule without using the server 300. When timer charging based on DC charging is performed, the ECU 165 controls the communication device 155 to transmit data needed for setting the time schedule in the DC charging station 200 (for example, the timer setting information) to the server 300. The vehicle 100 can realize timer charging based on AC charging and timer charging based on DC charging.

OTHER EMBODIMENTS

The embodiment does not consider increasing the temperature of the electric power storage device 115. Increasing the temperature of the electric power storage device 115 is a process of increasing the temperature of the electric power storage device 115 to or above a predetermined temperature before the departure of the vehicle 100. Specifically, at a temperature increase start time that is set in advance, the ECU 165 is started to operate a heater (not illustrated) for warming the electric power storage device 115. Accordingly, the temperature of the electric power storage device 115 can be set to be higher than or equal to the predetermined temperature before the departure of the vehicle 100. For example, the technology disclosed in the embodiment can also be applied to the vehicle 100 that performs timer charging and increases the temperature of the electric power storage device 115. Even in such a case, the same applies as in the embodiment. When timer charging based on AC charging is performed, the temperature increase start time or the charging start time is set in the vehicle 100. When timer charging based on DC charging is performed, the temperature increase start time or the charging start time is set in the DC charging station 200. Accordingly, the vehicle 100 can perform timer charging based on AC charging and increase the temperature of the electric power storage device 115, and perform timer charging based on DC charging and increase the temperature of the electric power storage device 115.

In the embodiment, the charging start time that is set in timer charging is not changed. However, for example, it is considered that the charging start time is reset due to a change and the like in the temperature of the electric power storage device 115. In such a case, for example, the ECU 165 is started when the previously set charging start time is reached, and the ECU 165 recalculates the charging start time. When a predetermined or longer time period is left before the recalculated charging start time, the ECU 165 transitions to the sleep state again, and the ECU 165 is started again when the recalculated charging start time is reached. Accordingly, charging of the electric power storage device 115 can be started at a more appropriate time. For example, the technology disclosed in the embodiment can also be applied to the vehicle 100 that may reset the charging start time as described above. Even in such a case, the same applies as in the embodiment. When timer charging based on AC charging is performed, the charging start time is reset in the vehicle 100. When timer charging based on DC charging is performed, the charging start time is reset in the DC charging station 200. Accordingly, the vehicle 100 can reset the charging start time in timer charging based on AC charging, and reset the charging start time in timer charging based on DC charging.

In the embodiment, the vehicle 100 transmits the vehicle ID to the server, and the server 300 specifies the DC charging station 200 associated with the vehicle ID (by referencing the database 600 (FIG. 4)). However, the method of specifying the DC charging station 200 used by the user of the vehicle 100 is not limited thereto. For example, the DC charging station 200 used by the user may be registered in advance in the vehicle 100. The vehicle 100 may transmit the registered information of the DC charging station 200 to the server 300, and the server 300 may specify the DC charging station 200 in accordance with the received information.

The embodiment disclosed herein is for illustrative purposes from every point of view and should not be considered restrictive. The scope of the present disclosure is not disclosed by the description and is disclosed by the claims, and is intended to include all changes made within the equivalent meaning and scope of the claims.

What is claimed is:

1. A vehicle that enables external charging which is charging of a vehicle-mounted electric power storage device using electric power supplied from an electric power supply outside the vehicle, the vehicle comprising:
   a communication device configured to communicate with a server outside the vehicle; and
   an electronic control unit configured to execute both of a process for alternating current charging that is the external charging using alternating current electric power supplied from an alternating current electric power supply facility as the electric power supply, and a process for direct current charging that is the external charging using direct current electric power supplied from a direct current electric power supply facility as the electric power supply, the direct current electric power supply facility being configured to communicate with the server, wherein:
   the electronic control unit is configured to execute a process for timer charging that is the external charging executed in accordance with a set time schedule; and
   the electronic control unit is configured to
      set the time schedule in the vehicle without using the server when the timer charging based on the alternating current charging is performed, and
      control the communication device to transmit data needed for setting the time schedule in the direct current electric power supply facility to the server when the timer charging based on the direct current charging is performed.

2. The vehicle according to claim 1, wherein:
when electric power information indicating an amount of electric power suppliable by the direct current electric power supply facility in the direct current charging is received from the direct current electric power supply facility after the data is transmitted to the server, the electronic control unit is configured to calculate a time period required for charging the electric power storage device in accordance with the received electric power information; and
the calculated time period is used for setting the time schedule in the direct current electric power supply facility.

3. The vehicle according to claim 1, wherein the electronic control unit is configured to control the communication device to transmit a vehicle identification of the vehicle and an expected departure time to the server when the timer charging based on the direct current charging is performed.

4. A method of controlling a vehicle that enables external charging which is charging of a vehicle-mounted electric power storage device using electric power supplied from an electric power supply outside the vehicle, the vehicle including an electronic control unit configured to enable both of alternating current charging that is the external charging using alternating current electric power supplied from an alternating current electric power supply facility as the electric power supply, and direct current charging that is the external charging using direct current electric power supplied from a direct current electric power supply facility as the electric power supply, the direct current electric power supply facility being configured to communicate with a server outside the vehicle, the method comprising:
by the electronic control unit, controlling the vehicle to set a time schedule in the vehicle without using the server when timer charging that is the external charging executed in accordance with the set time schedule is performed based on the alternating current charging; and
by the electronic control unit, controlling the vehicle to transmit data needed for setting the time schedule in the direct current electric power supply facility to the server when the timer charging is performed based on the direct current charging.

5. The method according to claim 4, wherein the electronic control unit is configured to control a communication device to transmit a vehicle identification of the vehicle and an expected departure time to the server when the timer charging based on the direct current charging is performed.

6. A charging system comprising:
a vehicle that enables external charging which is charging of a vehicle-mounted electric power storage device using electric power supplied from an electric power supply outside the vehicle;
a server outside the vehicle; and
a direct current electric power supply facility as the electric power supply, the direct current electric power supply facility being configured to supply direct current electric power to the vehicle through a charging cable, wherein:
the vehicle includes
a communication device configured to communicate with the server, and
an electronic control unit configured to execute both of a process for alternating current charging that is the external charging using alternating current electric power supplied from an alternating current electric power supply facility as the electric power supply, and a process for direct current charging that is the external charging using direct current electric power supplied from the direct current electric power supply facility;
the electronic control unit is configured to execute a process for timer charging that is the external charging executed in accordance with a set time schedule;
the electronic control unit is configured to
set the time schedule in the vehicle without using the server when the timer charging based on the alternating current charging is performed, and
control the communication device to transmit data needed for setting the time schedule in the direct current electric power supply facility to the server when the timer charging based on the direct current charging is performed;
the server is configured to transmit the data received from the vehicle to the direct current electric power supply facility; and
the direct current electric power supply facility is configured to execute a process for setting the time schedule using the data received from the server.

7. The charging system according to claim 6, wherein the server is configured to register a vehicle identification assigned per vehicle and a direct current electric power supply facility identification assigned per direct current electric power supply facility corresponding to each vehicle identification.

8. The charging system according to claim 6, wherein the electronic control unit is configured to control the communication device to transmit a vehicle identification of the vehicle and an expected departure time to the server when the timer charging based on the direct current charging is performed.

9. The charging system according to claim 8, wherein the server is configured to transmit the expected departure time received from the vehicle to the direct current electric power supply facility that corresponds to the vehicle identification received from the vehicle.

10. The charging system according to claim 9, wherein:
the direct current electric power supply facility is configured to transmit a charging start signal and suppliable electric power information to the vehicle through the charging cable based on the expected departure time;
the vehicle is configured to calculate a required charging time period based on the suppliable electric power information and transmit the vehicle identification and the required charging time period to the server;
the server is configured to transmit the required charging time period to the direct current electric power supply facility; and
the direct current electric power supply facility is configured to determine a charging start time based on the required charging time period and the expected departure time and start the process for the direct current charging when the charging start time is reached.

* * * * *